April 1, 1952  L. B. COURTOT  2,591,514

PUSH TYPE DRAIN VALVE

Filed Jan. 20, 1950

INVENTOR.
LOUIS B. COURTOT.
BY Richey & Watts
ATTORNEYS.

Patented Apr. 1, 1952

2,591,514

UNITED STATES PATENT OFFICE 2,591,514

PUSH TYPE DRAIN VALVE

Louis B. Courtot, Cleveland, Ohio, assignor to The Weatherhead Company, Cleveland, Ohio, a corporation of Ohio Application January 20, 1950, Serial No. 139,605

4 Claims. (Cl. 137—34)

This invention relates to valves and, more particularly, to improvements in valves having a spring-loaded valve member that may be locked or latched in its open position.

In many instances, such as where valves are employed as drain cocks for vehicle radiators, the valves are relatively inaccessible so that manipulation thereof becomes a problem. The same applies to drain cocks of various types fitted to airplane and boat engines. These valves should also be of simple and sturdy construction, leak-proof, and economy of manufacture is of great importance.

It is an object of the present invention to provide a valve that is non-freezing, may be readily opened and closed, and is latched in its open position and has a body formed from polygonal stock. Briefly, this is accomplished by providing a spring-loaded valve member wherein the spring holds the valve member in its closed position and wherein the valve member may be moved to its open position by moving it against the force of the spring. There is a latch arm on the valve member aligned with a relieved portion of a polygonal flange on the body member, such as the flat of a hexagonal flange, whereupon rotation of the valve member the latch arm is pressed against the flange by a spring to hold the valve open. To insure that the valve will remain latched in its open position, depressions are formed on the valve latch arm that receive the corners of a polygonal body flange.

Another object resides in facilitating manipulation of the valve handle. This is accomplished by forming the handle of a cross-shaped stamping. Two of the arms of the cross are reverse bent to form latch fingers and the other two bent up to form wing-like finger grips.

The manner in which these and other objects and advantages may be attained will be apparent from the following detailed description of the preferred embodiment of the invention.

Figure 1:
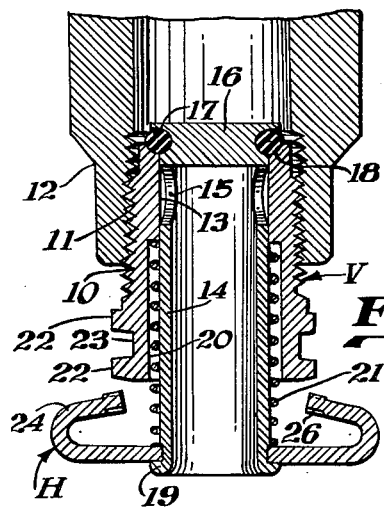
Fig. 1 is an axial section through the valve in its open position.
Figure 2:
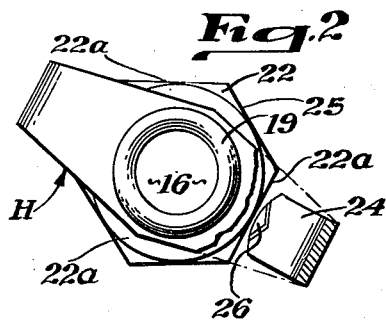
Fig. 2 is an end view of the valve.
Figure 3:
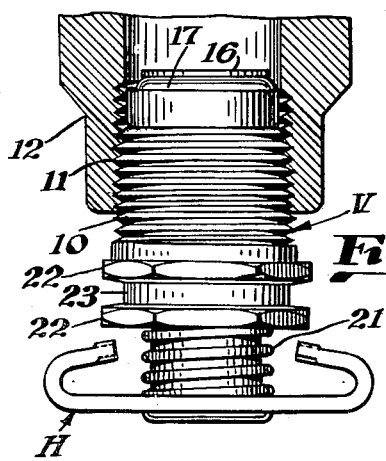
Fig. 3 is a side view showing the valve in its closed position.
Figure 4:
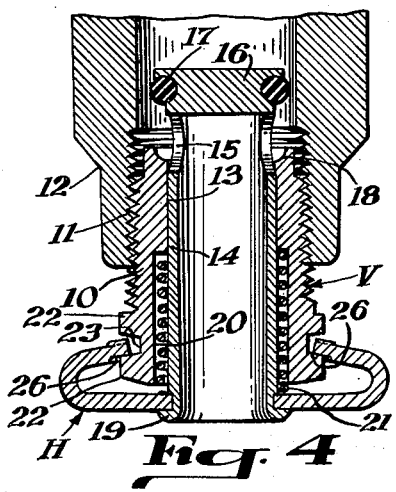
Fig. 4 is a section showing the valve opened.
Figure 5:
Figs. 5 and 6 show details of the latch means.
Figure 6:
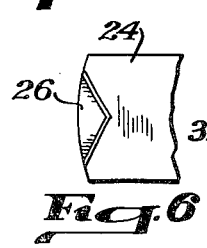

Referring to the drawings, the valve V includes a body 10 which may be formed with a threaded attaching nipple 11 for connection with a suitable receptacle or nipple 12. The body has an axial bore 13 which rotatably and slidably receives a sleeve-like valve member 14 having a closed end 16 which carries suitable sealing means such as an O-ring 17. A valve seat 18 is formed at the adjacent end of the valve body and the sleeve 14 is apertured as at 15 so that when the valve is in its open position fluid may pass therethrough. A handle H is attached to the valve member by suitable means such as a lip 19 spun over the handle.

In order to hold the valve member in its closed position the body is counterbored as at 20 to receive a spring 21 which engages both the body and the valve members. Means are provided so that the valve member may be readily and simply latched in its open position. In the form shown in Figs. 1 to 4, the valve body has been machined from hexagonal stock so that polygonal flanges 22 are provided by machining the body to form an intermediate groove 23.

The handle H is bent from a stamping and includes oppositely-disposed, radially inwardly extending arms 24 preferably formed by reverse-bending the sheet metal stock of the handle before it is attached to the valve member. A specially formed detent recess 26 is imparted to the end portion of each arm 24. In the preferred form the flanges 22 are hexagonal or octagonal so that flats 22a are provided which serve as relieved portions. The included angle of detent 26 equals the angle between the flats 22a which would be 120° if the body were formed of hexagonal stock.

In operation, as seen in Fig. 1, with the handle clear of the body the spring 21 urges the sealing ring 17 against the valve seat 18 thereby blocking fluid communication to port 15 in the valve member. If it is desired to open the valve the handle is gripped and turned until arms 24 are aligned with flats 22a whereupon the valve member is moved against the force of the spring until arms 24 are disposed outwardly of groove 23. This axial motion of the valve member is made possible because of the clearance of the end of arms 24 and the flats 22a of the valve body. The valve can also be opened by pushing the handle against the body and rotating the handle until it clears the flats.

With the valve member in the open position it may be partially rotated to bring detents 26 on the arms adjacent the corners of flange 22 whereupon the valve member may be released. If the detents 26 are not riding over the corners a slight rotation of the valve member will bring them into position wherein the spring will snap the detents over the corners and thereby prevent rotation and release of the latch means. Thus, the valve can be entirely manipulated by the sense of touch.

Figure 7:
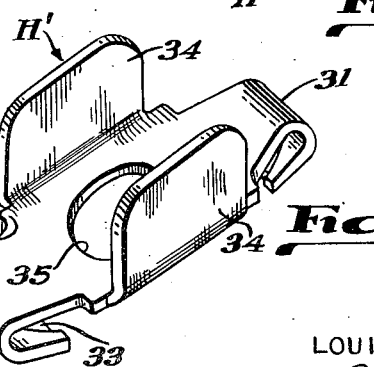
Fig. 7 shows a modified form of handle.

In the form shown in Fig. 7 additional grip surfaces are provided to facilitate manipulation of the valve. The handle H' is connected to the valve member as described. The body 30 has arms 31 reversely as at 32 and detented as at 33 as before. However, wings 34 are bent up from the cross-shaped blank for the handle to provide additional gripping surface. Hole 35 is punched in the body for attachment to the valve member.

A valve constructed in accordance with this invention is unusually economical to manufacture, may be readily opened and closed when in an inaccessible position, and will provide a firm, resilient seal without danger of excessive pressure against the soft seat as is found in valves of the screw-threaded type.

Having completed a detailed description of a preferred form of the invention it will be apparent that other forms thereof may be provided without departing from the essence of the invention as defined in the appended claims.

What is claimed is:

1. A valve comprising a body member, a bore in said body member, a valve member slidably and rotatably mounted in said body bore, valve seat and valve seat engaging means associated with said members, a spring engaging said members and arranged for urging said valve seat means into engagement, a polygonal flange extending from said body, and latch means extending radially from said valve member, said latch means including a radially inwardly extending arm, the inner end of said arm having a recess formed to snugly receive a corner of said polygonal flange and clearing the flats of said polygonal flange when the valve member is moved axially against the force of said spring with said arm aligned with a flat, said spring thereafter pressing the recessed portion of said arm into engagement with a corner of said polygonal flange upon partial rotation of said valve member, said handle also including a pair of opposed wing-like grips bent up from said handle intermediate said radial arms.

2. A valve comprising a body member, a bore in said body member, a valve member slidably and rotatably mounted in said body bore, valve seat and valve seat engaging means associated with said members, a spring engaging said members and arranged for urging valve member in one axial direction to bring said valve seat means into engagement, radial non-circular flange means extending from said body and having corners and intermediate relieved portions, said flange means having a smooth generally radial surface facing in the other axial direction, and latch means extending radially from said valve member, said latch means including a radially inwardly extending arm, the inner end of said arm having a recess, said recess having a generally radial bottom wall and side walls at an angle thereto, the bottom wall of said recess being formed to engage a portion of said smooth generally radial flange surface and the side walls of said recess being formed to engage the edges of said flange corners, said arm clearing said relieved flange portions when the valve member is moved axially against the force of said spring with said arm aligned with one of said relieved flange portions, said spring thereafter pressing the recessed portion of said arm into engagement with a corner of said flange upon turning of said valve member to align said arm with a flange corner portion.

3. A valve comprising a body member, a bore in said body member, a valve member slidably and rotatably mounted in said body bore, valve seat and valve seat engaging means associated with said members, a spring engaging said members and arranged for urging valve member in one axial direction to bring said valve seat means into engagement, a polygonal flange extending from said body, said polygonal flange having a smooth generally radial surface facing in the other axial direction, and latch means extending radially from said valve member, said latch means including a radially inwardly extending arm, the inner end of said arm having a recess, said recess having a generally radial bottom wall and side walls at an angle thereto, the bottom wall of said recess being formed to engage a portion of said smooth generally radial surface and the side walls of said recess being formed to engage the edges of a corner of said polygonal flange, said arm clearing the flats of said polygonal flange when the valve member is moved axially against the force of said spring with said arm aligned with a flat, said spring thereafter pressing the recessed portion of said arm into engagement with a corner of said polygonal flange upon partial rotation of said valve member.

4. A valve comprising a body member, a bore in said body member, a valve member slidably and rotatably mounted in said body bore, valve seat and valve seat engaging means associated with said members, a spring engaging said members and arranged for urging valve member in one axial direction to bring said valve seat means into engagement, a polygonal flange extending from said body, said polygonal flange having a smooth generally radial surface facing in the other axial direction, a sheet metal handle attached to said valve member, said handle having an inturned generally flat end forming a radially inwardly extending arm, the inner end of said arm having an axially offset triangular portion forming a recess with an offset radial bottom wall and side walls at an angle thereto, the bottom wall of said recess being formed to engage a portion of said smooth generally radial surface and the side walls of said recess being formed to engage the edges of a corner of said polygonal flange, said arm clearing the flats of said polygonal flange when the valve member is moved axially against the force of said spring with said arm aligned with a flat, said spring thereafter pressing the recessed portion of said arm into engagement with a corner of said polygonal flange upon partial rotation of said valve member.

LOUIS B. COURTOT.

REFERENCES CITED

The following references are of record in the file of this patent:

UNITED STATES PATENTS

| Number | Name | Date |
| --- | --- | --- |
| 1,070,131 | Holton | Aug. 12, 1913 |
| 1,271,625 | Snyder | July 9, 1918 |
| 2,506,722 | Kuehn | May 9, 1950 |